(12) United States Patent
Cieslak, Jr.

(10) Patent No.: US 7,768,142 B2
(45) Date of Patent: Aug. 3, 2010

(54) GRAVITY MOTOR AND METHOD

(76) Inventor: Stanley Cieslak, Jr., 102 Creek Rd., McKees Rocks, PA (US) 15136

( * ) Notice: Subject to any disclaimer, the term of this patent is extended or adjusted under 35 U.S.C. 154(b) by 0 days.

(21) Appl. No.: 12/079,478

(22) Filed: Mar. 27, 2008

(65) Prior Publication Data
US 2009/0243305 A1 Oct. 1, 2009

(51) Int. Cl.
*F03G 3/00* (2006.01)
(52) U.S. Cl. ....................................... 290/1 R
(58) Field of Classification Search ................ 290/5
See application file for complete search history.

(56) References Cited

U.S. PATENT DOCUMENTS

| 4,194,393 | A | * | 3/1980 | Boley | 73/152.62 |
| 4,209,990 | A | * | 7/1980 | Shelton, Jr. | 60/640 |
| 4,474,002 | A | * | 10/1984 | Perry | 60/369 |
| 4,661,751 | A | * | 4/1987 | Werner | 388/820 |
| 5,905,312 | A | * | 5/1999 | Liou | 290/54 |
| 6,445,078 | B1 | | 9/2002 | Cieslak, Jr. | |
| 6,914,339 | B2 | | 7/2005 | Rios-Vega | |
| 6,981,376 | B2 | * | 1/2006 | Dutta | 60/639 |
| 2003/0155770 | A1 | | 8/2003 | Clinch | |
| 2004/0066042 | A1 | * | 4/2004 | Pessemier | 290/1 R |
| 2005/0017511 | A1 | * | 1/2005 | Dalton | 290/1 R |
| 2007/0035134 | A1 | | 2/2007 | Bristow, Jr. | |
| 2007/0090648 | A1 | * | 4/2007 | Barksdale | 290/1 R |
| 2007/0278800 | A1 | * | 12/2007 | Galich | 290/1 R |

FOREIGN PATENT DOCUMENTS

| DE | 4007888 A1 | * | 9/1991 |
| JP | 07259723 A | * | 10/1995 |
| JP | 10169539 A | * | 6/1998 |
| JP | 2002285953 A | * | 10/2002 |

* cited by examiner

*Primary Examiner*—Joseph Waks
(74) *Attorney, Agent, or Firm*—Carothers & Carothers

(57) ABSTRACT

A gravity motor wherein a beam is pivotally mounted intermediate its opposite ends for oscillation in a vertical plane about a pivot point on a support structure. A moveable weight is slidably connected to the beam for reciprocal movement between the opposite ends of the beam past the pivot point. A drive unit is mounted and engaged for driving the weight back and forth between opposite ends of the beam thereby causing reciprocation of the beam about the pivot point by gravity to rotate a shaft in order to generate electricity or to provide other motor functions.

8 Claims, 3 Drawing Sheets

GRAVITY MOTOR AND METHOD

BACKGROUND OF THE INVENTION

The present invention relates generally to motors, and more particularly to a motor that utilizes the force of gravity to impart rotational torque on a rotor for the generation of electricity or other purposes.

Gravity motors have been provided for producing a weight imbalance either in or about the rotor to produce rotary motion in order to operate a load, such as a generator, to produce electricity, pump to pump water, to turn an wheel, or to operate any other device requiring rotational torque. By harnessing gravitational force, the input energy for the motor is not dependent upon uncontrollable factors, such as wind, water or solar energy.

It is a principal object of the present invention to provide a gravity motor which is simpler in construction than those of the prior art.

SUMMARY OF THE INVENTION

The gravity motor of the present invention is comprised of a beam pivotally mounted intermediate its opposite ends to a support structure for oscillation about the pivot point in a vertical plane. A moveable weight is connected to the beam for reciprocal movement therealong between the opposite ends of the beam and back and forth past the pivot point. A drive unit is also provided to engage and drive the weight back and forth between the opposite ends of the beam thereby causing reciprocation of the beam about the pivot point by gravity.

The oscillating beam may be engaged for driving an electrical generator, or other purposes, as previously mentioned. Also, a speed control may be connected to the beam for controlling the speed at which the beam reciprocates about the pivot point.

In the preferable embodiment a plurality of the oscillating beams are connected in tandem for continuously rotatably driving a common shaft.

BRIEF DESCRIPTION OF THE DRAWINGS

Other objects and advantages appear hereinafter in the following description and claims. The accompanying drawings show, for the purpose of exemplification, without limiting the scope of the invention or the appended claims, certain practical embodiments of the present invention wherein:

DETAILED DESCRIPTION OF A PREFERRED EMBODIMENT

Figure 1:
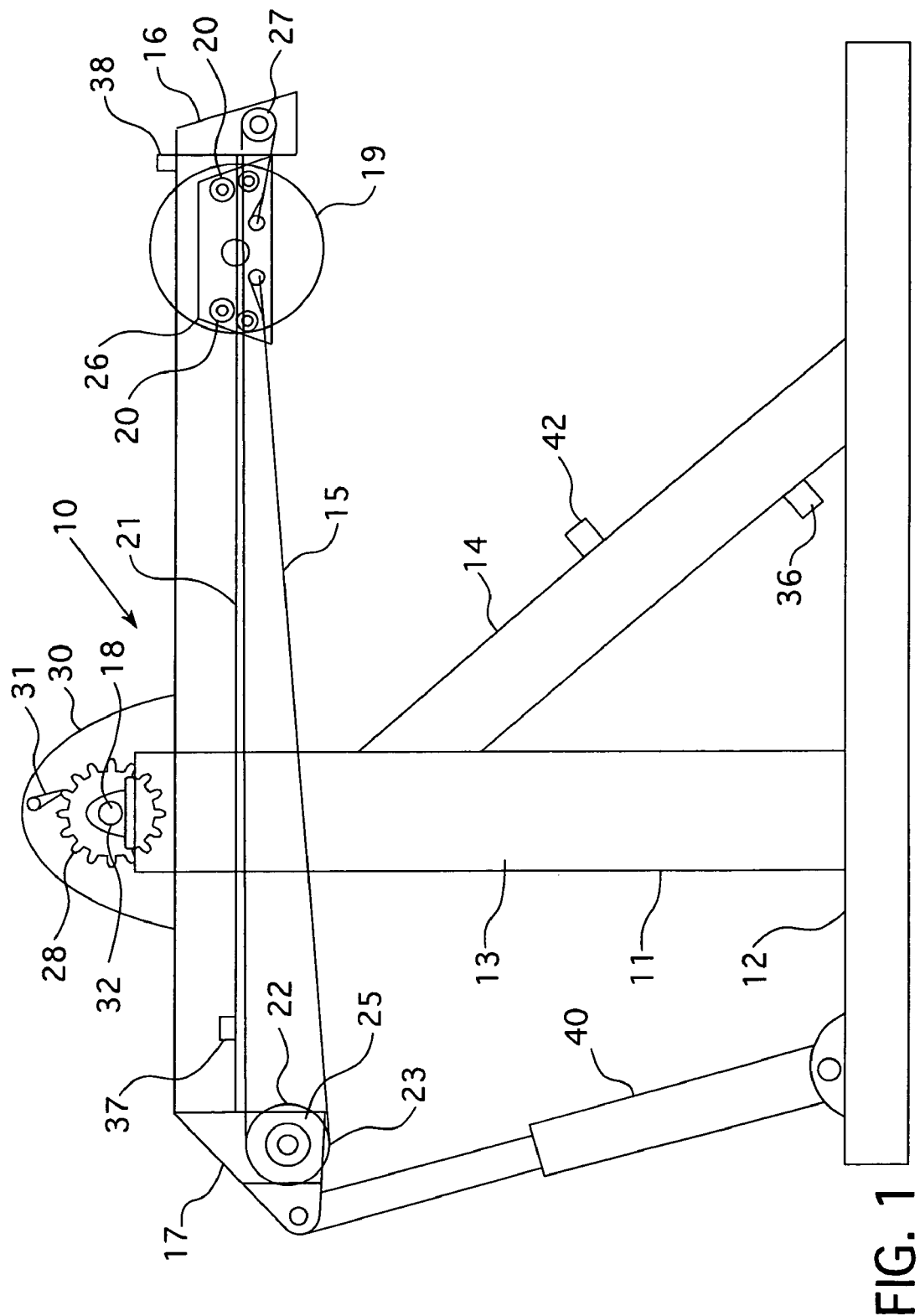
FIG. 1 is a schematic view in side elevation of the gravity motor of the present invention.
Figure 2:
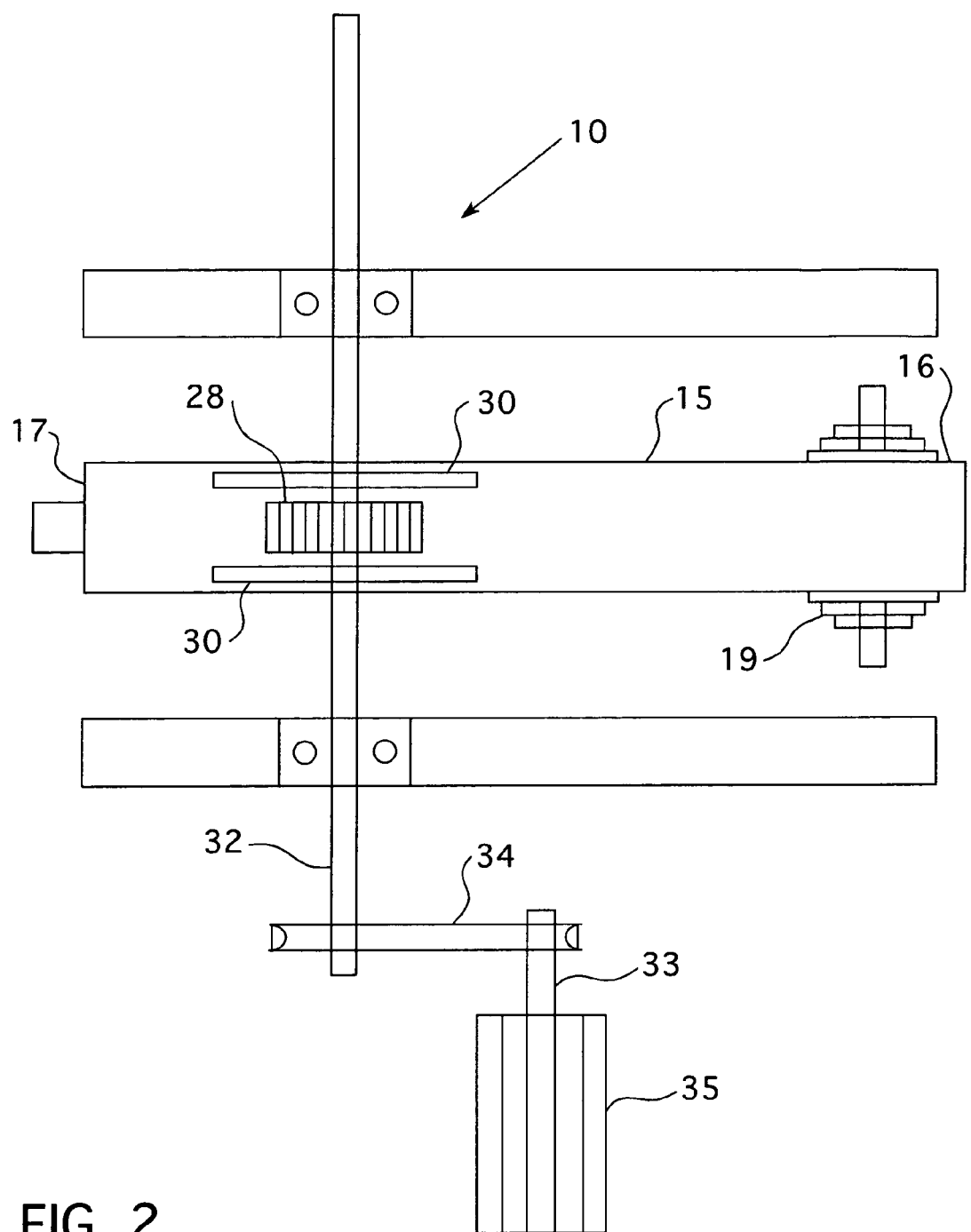
FIG. 2 is a schematic top view of the apparatus shown in FIG. 1.

Referring to the drawings, the gravity motor 10 of the present invention is comprised of a support structure 11 made up of base 12, vertical support 13 and diagonal brace 14. Beam 15 is pivotally mounted intermediate its opposite ends 16 and 17 for oscillation about pivot point 18 in a vertical plane. Moveable weight 19 is slidably connected to beam 15 by means of a dolly 26 supported by rollers 20 which ride or roll along track 21. Weight 19 is thereby mounted for reciprocal movement between the opposite ends 16 and 17 past the pivot point 18.

A drive unit 22 in the form of an electric motor 23 and drive cable 24 driven by motor 23 through drive pulley 25 and idler pulley 27, drives weight 19 back and forth between the opposite ends 16 and 17 of beam 15 on its dolly 26. This reciprocating drive accordingly causes reciprocation of beam 15 about pivot point 15 by gravity for intermittent rotation of drive gear 28.

Describing a cycle of operation of the gravity motor of the present invention as illustrated with reference to the figures, when the weight 19 on its dolly 26 is positioned as shown at the end 16 of beam 15 as illustrated in FIG. 1, the beam 15 will rotate clockwise about pivot point 18 and the end 16 will thereby descend downwardly in an arc about pivot point 18. When this occurs, ear 30, which is welded to the top of beam 15, also rotates clockwise as seen in FIG. 1 about pivot point 18 thereby causing dog 31 to engage gear 28 and to also rotate gear 28 in the clockwise direction. Gear 28 is rigidly secured to shaft 32, which in turn rotates generator shaft 33 through pulley drive belt combination 34 to actuate generator 35 to generate electricity.

Once beam 15 has rotated fully clockwise to a down position, proximity switch 36 is activated to in turn activate drive motor 23 and thereby move weight 19 together with its dolly 26 to the far left end 17 of beam 15. When dolly 26, together with weight 19 returns to the far left to the end 17 of beam 15, proximity switch 37 is activated to stop the dolly 26 by disengaging the drive unit 23. At this point, the beam 15, due to the torque applied by the weight 19 being positioned beyond pivot point 18 and to the far left or at end 17 of beam 15, will cause beam 15 to rotate counterclockwise back to its beginning position illustrated in FIG. 1.

Once this position has been attained another limit switch (not shown) is actuated to then energize drive unit 23 in the opposite direction to return weight 19 together with its dolly 26 to the beginning position as illustrated in FIG. 1 at the far right end 16 of beam 15. Once the weight 19 is returned to this position, proximity switch 38 is activated and stops further energization of the drive unit 23. Thereafter the cycle is repeated to cyclically drive shaft 32 in an intermittent fashion to generate electricity.

Hydraulic cylinder 40 is mounted between base 12 and end 17 of beam 15 to regulate the speed at which the arm 15 will rotate in the clockwise direction and also in the counterclockwise direction.

Figure 3:
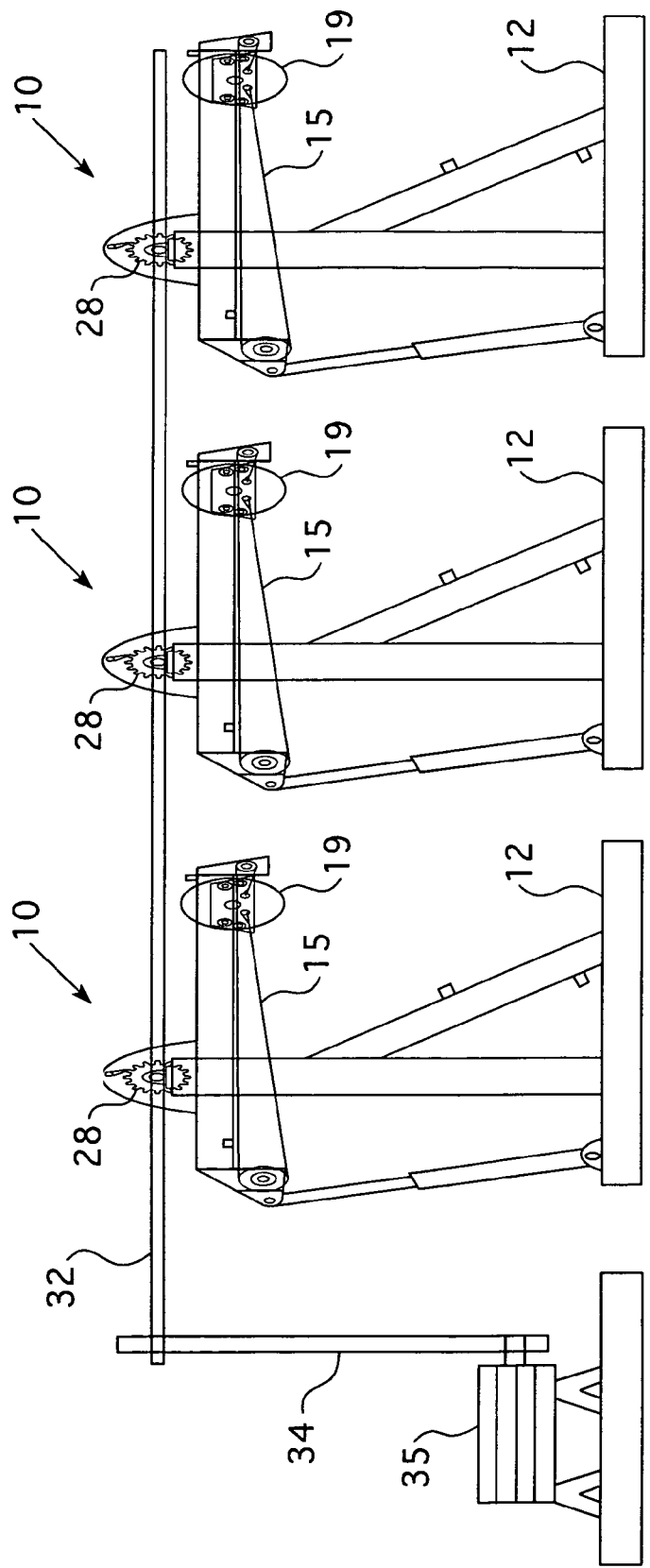
FIG. 3 is a schematic illustration of a plurality of the apparatus shown in FIGS. 1 and 2 as connected in tandem for rotatably driving a common shaft in a continuous manner

FIG. 3 shows three of the gravity motors 10 of the present invention hooked in tandem so that the units may respectively rotationally drive shaft 32 in a continuous manner while an adjacent one of the apparatus 10 is being rotated counterclockwise to its starting position. This tandem operation is synchronized by the use of limit switches 42. When arm 15 is in its most clockwise position or down position, proximity switch 42 is then activated to begin operation of the next adjacent gravity motor 10 to provide successive smooth operation of the system to provide continuous rotary movement of drive shaft 32.

In FIG. 3, common shaft 32 drives a single generator 35. However, multiple generators 35 may be driven simultaneously from shaft 32.

I claim:

1. A gravity motor comprising:
   a support structure;
   a beam pivotally mounted intermediate its opposite ends to said support structure for oscillation about a pivot point in a vertical plane;

a moveable weight slidably connected to said beam for reciprocal movement between said opposite ends and past said pivot point; and a drive unit mounted and engaged for driving said weight back and forth between said opposite ends thereby causing reciprocation of said beam about said pivot point by gravity.

2. The gravity motor of claim 1, said oscillating beam engaged for driving an electrical generator.

3. The gravity motor of claim 1, including speed control means connected to said beam for controlling the speed at which said beam reciprocates.

4. The gravity motor of claim 1, including a plurality of said oscillating beams connected in tandem for rotatably driving a common shaft.

5. A method of producing rotational torque using gravitational pull, the method comprising:

attaching a beam to a horizontal rotatable shaft intermediate its opposite ends;

slidably mounting a movable weight on said beam for reciprocal movement between said opposite ends and past said shaft; and driving said weight back and forth between said opposite ends and thereby reciprocating said beam in a vertical plane for rotatably driving said shaft.

6. The method of claim 1, including driving an electrical generator with said rotating shaft.

7. The method of claim 1, including controlling the speed at which said beam reciprocates.

8. The method of claim 1, wherein a plurality of said beams are reciprocated in tandem for rotating said shaft.

* * * * *